United States Patent
Chuang et al.

(10) Patent No.: US 7,779,400 B2
(45) Date of Patent: Aug. 17, 2010

(54) SYSTEM AND METHOD FOR MODIFYING FIRMWARE OF AN OPTICAL STORAGE MEDIUM DEVICE WITHOUT REQUIRING A COMPILING PROCESS

(75) Inventors: Willy Chuang, Taipei Hsien (TW); Jakie Yeh, Taipei Hsien (TW); Shangen Wang, Taipei Hsien (TW); Jonathan Lin, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 1289 days.

(21) Appl. No.: 11/164,777

(22) Filed: Dec. 5, 2005

(65) Prior Publication Data

US 2007/0055794 A1   Mar. 8, 2007

(30) Foreign Application Priority Data

Sep. 7, 2005   (TW) ............................... 94130752 A

(51) Int. Cl.
 *G06F 9/44* (2006.01)
(52) U.S. Cl. ..................................... 717/168
(58) Field of Classification Search ............... 717/168
 See application file for complete search history.

(56) References Cited

U.S. PATENT DOCUMENTS

| 7,047,497 B2 * | 5/2006 | Patrizio et al. ............... 715/760 |
| 2002/0013865 A1 * | 1/2002 | Toh et al. ......................... 710/8 |
| 2004/0123281 A1 * | 6/2004 | Olrik et al. ................... 717/168 |
| 2005/0097542 A1 | 5/2005 | Lee |
| 2005/0102319 A1 * | 5/2005 | Hoeft et al. .............. 707/103 Y |
| 2005/0114851 A1 * | 5/2005 | Watson-Luke et al. ...... 717/168 |
| 2005/0160257 A1 | 7/2005 | Kruger |
| 2005/0273755 A1 * | 12/2005 | Bass et al. ................... 717/100 |
| 2006/0031815 A1 * | 2/2006 | Bhagia et al. ............... 717/106 |
| 2006/0041879 A1 * | 2/2006 | Bower et al. ................ 717/162 |
| 2006/0080636 A1 * | 4/2006 | Hsieh .......................... 717/101 |
| 2006/0184924 A1 * | 8/2006 | Hsieh .......................... 717/140 |
| 2006/0184929 A1 * | 8/2006 | Ohtsuka ...................... 717/168 |
| 2006/0195835 A1 * | 8/2006 | Olrik et al. ................... 717/168 |
| 2007/0112446 A1 * | 5/2007 | Deveaux et al. ............... 700/83 |
| 2008/0148229 A1 * | 6/2008 | Gownder et al. ............ 717/115 |
| 2008/0256455 A1 * | 10/2008 | Dell Ripa et al. ........... 715/735 |
| 2009/0074309 A1 * | 3/2009 | Cote ........................... 382/233 |
| 2009/0183140 A9 * | 7/2009 | Peck et al. ................... 717/113 |

FOREIGN PATENT DOCUMENTS

| TW | 344059 | 11/1998 |
| TW | 200414045 | 8/2004 |

\* cited by examiner

*Primary Examiner*—Anna Deng
(74) *Attorney, Agent, or Firm*—Winston Hsu

(57) ABSTRACT

Firmware of an optical storage medium device includes an executable program code and at least one reference data set. A method for modifying the firmware without requiring a compiling process includes inputting an attribute data set for setting a user interface; modifying the firmware by modifying the reference data set according to the attribute data set, wherein the executable program code is not modified when the firmware is being modified; determining if the modified firmware is capable of performing a target operation before the modified firmware is written into the optical storage medium device, wherein the user interface can be displayed according to the attribute data set; displaying the user interface according to the attribute data set; and writing the modified firmware into the optical storage medium device after the modified firmware is capable of performing the target operation.

24 Claims, 6 Drawing Sheets

SYSTEM AND METHOD FOR MODIFYING FIRMWARE OF AN OPTICAL STORAGE MEDIUM DEVICE WITHOUT REQUIRING A COMPILING PROCESS

BACKGROUND OF THE INVENTION

1. Field of the Invention

The present invention relates to a system and a method for modifying firmware, and more specifically, to a system and a method for modifying firmware of an optical storage medium device without requiring a compiling process.

2. Description of the Prior Art

Video compact discs (VCDs) and digital versatile discs (DVDs) are popular storage media nowadays and there are many VCD/DVD players and recorders on the market. Different video players usually comprise on screen display (OSD) systems and setup menu systems. A user may employ the OSD system or the setup menu systems to adjust configurations related to playback quality controls or functions and options of the video player. For example, the user can choose a particular section of the video content stored on the disc for playback by the video player.

Please refer to FIG. 1 showing a functional block diagram of a video player 10 according to the related art. For example, the video player 10 could be a consumer device such as a digital video disc (DVD) player and includes a processor 12 and a memory unit 14. Generally speaking, the memory unit 14 is a read only memory (ROM) and stores a firmware 16, which is an executable file used to store binary code for controlling the operation of the video player 10. Usually the firmware 16 is generated by compiling source code provided by the manufacturer of the video player 10, and the source code is written in a programming language such as the C programming language or another high level programming language that must be compiled to generate binary code. As shown in FIG. 1, the processor 12 is coupled to the memory unit 14 and a display 18 for reading and executing the firmware 16 to thereby control the video player 10. The display 18 can be utilized for displaying a user interface provided according to the firmware 16, or for displaying the contents of an optical disc played by the video player 10.

According to the related art design process, when developing the firmware 16 of the video player 10 (e.g., for providing the OSD system and the setup menu system of the user interface), the manufacturer of the video player 10 must develop a C program (or a program composed of source code according to another programming language) to meet the requirements specified by a customer. The C program must then be compiled to generate an executable file (i.e., the firmware 16). To complete the process, the firmware 16 is stored into the memory unit 14 of the video player 10. When the manufacturer performs a functional test of the firmware 16, according to a typical method, the manufacturer utilizes the processor 12 to execute the firmware 16 so as to control the video player 10. This process allows the manufacturer to verify whether the execution result meets the requirements as specified by the customer.

Please refer to FIG. 2 showing a flowchart describing the steps of generating and modifying firmware according to the related art. As previously mentioned, the manufacturer of the video player 10 conventionally must create a program file, for example, using the C programming language, according to the hardware architecture of the video player 10 and the software requirements specified by the customer (steps 100 and 102). The program file stores the source code of the program and is compiled by a C compiler to obtain the firmware 16 (step 104). Please note that the program file could also contain a program written in another programming language. Conventionally, the firmware 16 cannot be verified to ensure that it meets the design requirements specified by the customer until after the firmware 16 is stored into the memory unit 14 of the video player 10 at step 106. Afterwards, a function verification process can be performed on the hardware platform of the video player 10. In other words, the processor 12 executes the firmware 16 and then performs the function verification process (step 108). When the testing results of the function verification process do not meet the requirements of the customer, the manufacturer must modify the program file according to the testing results to try to meet the requirements (step 112). The program file is then re-compiled to again generate corresponding firmware 16 (step 104), and the above-mentioned function verification process is again executed on the hardware device (the video player 10) to check if the new firmware 16 can enable the video player 10 to execute target operations that meet the requirements specified by the customer.

As shown in FIG. 2, if the customer wants to redesign a function related to the firmware 16 of the video player 10, a large number of tests need to be performed utilizing the hardware (i.e., the video player 10). In addition, step 104 in which the program file is compiled to generate the corresponding firmware 16 is time-consuming, and this results in substantial delays during the product development process. Step 104 is inevitable when a hardware test on the video player 10 is performed because a firmware coding engineer cannot directly modify or edit the firmware 16 without the use of a software package based on the C programming language or a similar high-level programming language. That is, the program file must be compiled so as to generate the modified firmware 16 in order to test each version of the firmware 16 during development. Additionally, the customer may be incapable of editing program files and may instead simply provide their specifications (i.e., the design requirements of the OSD system and the setup menu system) or feedback to the manufacturer of the video player 10 in a written form or during an oral conversation. The firmware coding engineer of the manufacturer must then modify the program file according to the requirements specified by the customer, and the modified program file must be re-compiled to obtain the corresponding modified firmware 16. Afterwards, the function verification process is performed on the hardware platform of the video player 10, and the customer can again give feedback on the test results. The program file may then be modified according to the customer's feedback if necessary, and the above-mentioned compiling step is repeated yet again. Obviously, using the above-mentioned communication process and design flow may be unable to efficiently identify actual customer requirements and may even result in misunderstandings between the developer and the customer. Therefore, significant effort and time may be expended on the resulting modification cycles and various design corrections.

SUMMARY OF THE INVENTION

A system and a method is provided for modifying firmware of an optical storage medium device without requiring a compiling process, in order to solve the above-mentioned problems.

According to one exemplary embodiment, a method for modifying firmware of an optical storage medium device is disclosed. The firmware includes an executable program code and at least one reference data set. The method comprises inputting an attribute data set for setting a user interface; and modifying the reference data set according to the input attribute data set, wherein the executable program code is not modified when the firmware is being modified.

In addition, the claimed invention provides a method for modifying firmware of an optical storage medium device. The firmware includes an executable program code and at least one reference data set. The method comprises inputting an attribute data set for setting a user interface; modifying the reference data set according to the attribute data set, wherein the executable program code is not modified when the firmware is being modified; determining if the modified firmware is capable of performing a target operation before the modified firmware is written into the optical storage medium device, wherein the user interface is capable of being displayed according to the attribute data set; displaying the user interface according to the input attribute data set; and writing the modified firmware into the optical storage medium device after the modified firmware is recognized as performing the target operation.

According to the claimed invention, a system for modifying firmware of an optical storage medium device is disclosed. The system comprises a storage unit for storing a firmware, the firmware including an executable program code and at least one reference data set, wherein the executable program code reads the reference data set to control operations of the optical storage medium device; and a data editing unit for receiving an attribute data set used for setting a user interface and modifying the reference data set according to the received attribute data set, wherein the executable program code is not modified when the firmware is being modified.

Additionally, the claimed invention provides a system for modifying firmware of an optical storage medium device. The system comprises a storage unit for storing a firmware, the firmware including an executable program code and at least one reference data set, wherein the executable program code reads the reference data set to control operations of the optical storage medium device; a data editing unit for receiving an attribute data set used for setting a user interface and modifying the reference data set according to the attribute data set, wherein the executable program code is not modified when the firmware is being modified; a testing unit for determining if the modified firmware is capable of performing a target operation before the modified firmware is written into the optical storage medium device, wherein the user interface is capable of being displayed according to the modified attribute data set; and a writing unit for writing the modified firmware into the optical storage medium device after the modified firmware is capable of performing the target operation.

The claimed invention provides a method for modifying firmware without requiring a compiling process. By using the data editing software, a customer of a video player manufacturer does not need to be skillful in programming languages or to be capable of editing programs. That is, the customer can utilize the disclosed data editing software provided by the video player manufacturer to easily modify the firmware of the video player according to the customer's particular requirements. It is therefore not necessary that the customer asks the firmware coding engineers of the video player to modify the source code of the firmware and execute a compiling process to compile the source code to generate the modified firmware for testing. Hence, time expended on the communication between the manufacturer and the customer is reduced, time expended on compiling the source code to generate the modified firmware is reduced, and both of the workload of the manufacturer and the customer are reduced. Additionally, the data code of the firmware is the only part that can be modified in the firmware. That is, the executable program code of the firmware will not be modified. Therefore, the executable program code can be protected from improper modification, and unexpected errors caused by repeatedly modifying the source code of the firmware according to the related art will not occur.

Another advantage of the present invention is that the customer can utilize a personal computer to execute an environment simulation software tool for testing the firmware. For example, to check if the execution result of the modified firmware meets the predetermined target, the customer would directly utilize the environment simulation software. In this way, the customer can save a significant amount of time because there is no need to wait for the modified firmware to be burned into the memory unit of the video player to facilitate the testing of the modified firmware to check the execution result (i.e., the firmware no longer needs to be tested solely on the hardware device). The present invention can be applied to an optical storage medium player or an optical storage medium recorder, such as a DVD player or a video compact disc (VCD) player, or other electronic products, to thereby reduce the costs and required time for product development.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
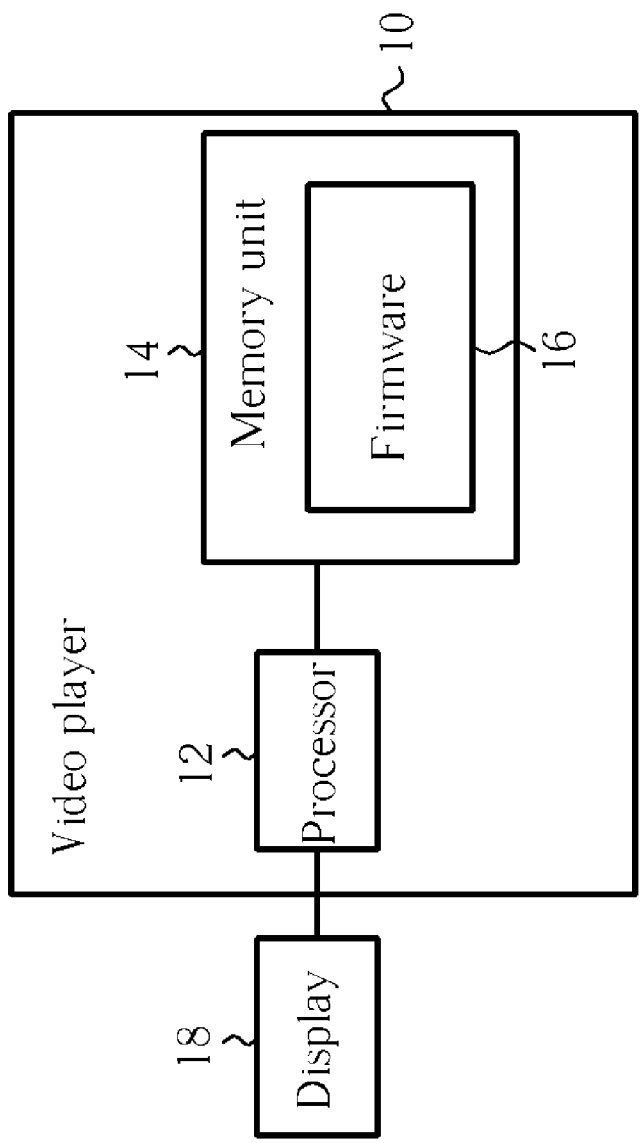
FIG. 1 is a functional block diagram of a video player according to the related art.
Figure 2:
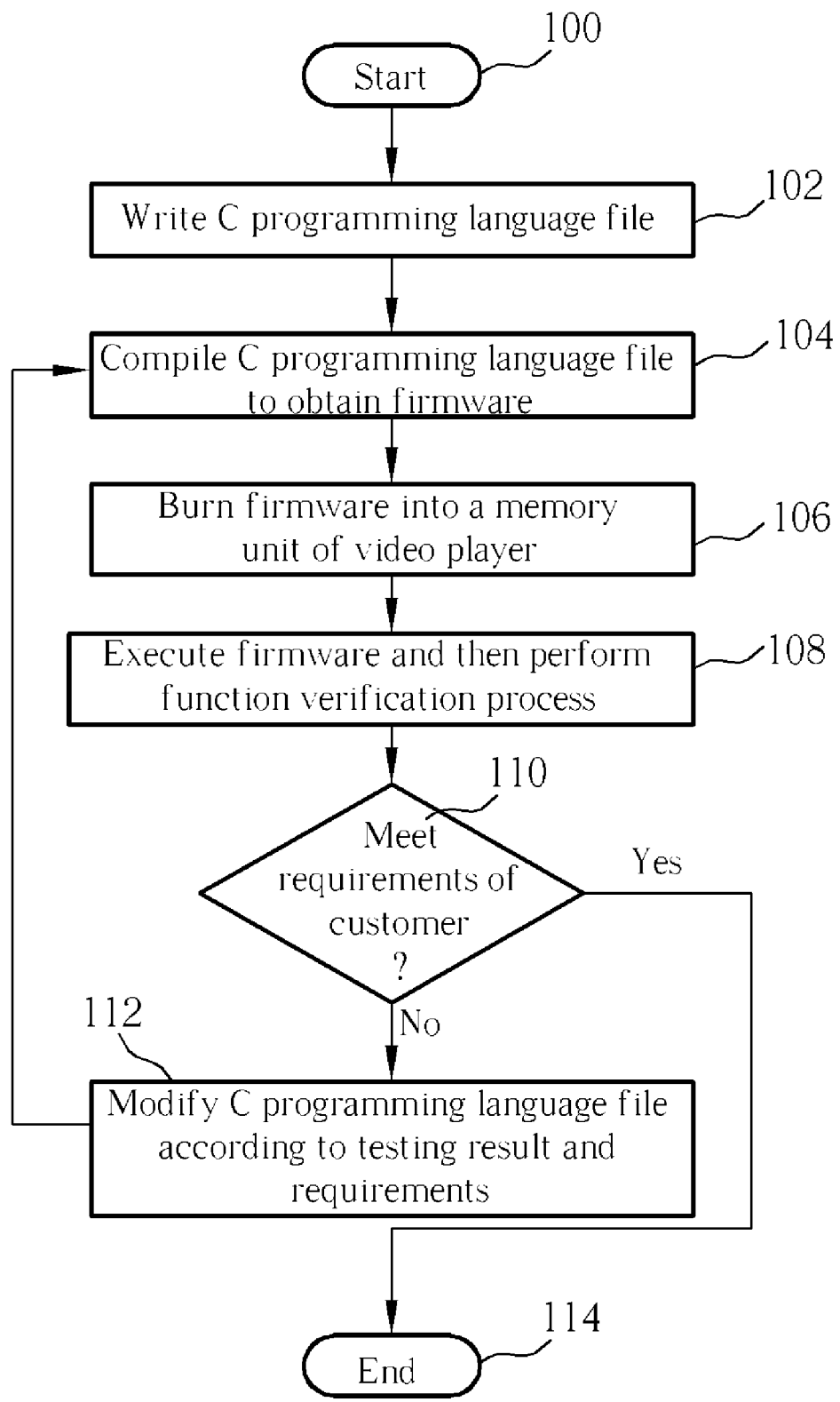
FIG. 2 is a flowchart describing steps of generating and modifying firmware according to the related art.
Figure 3:
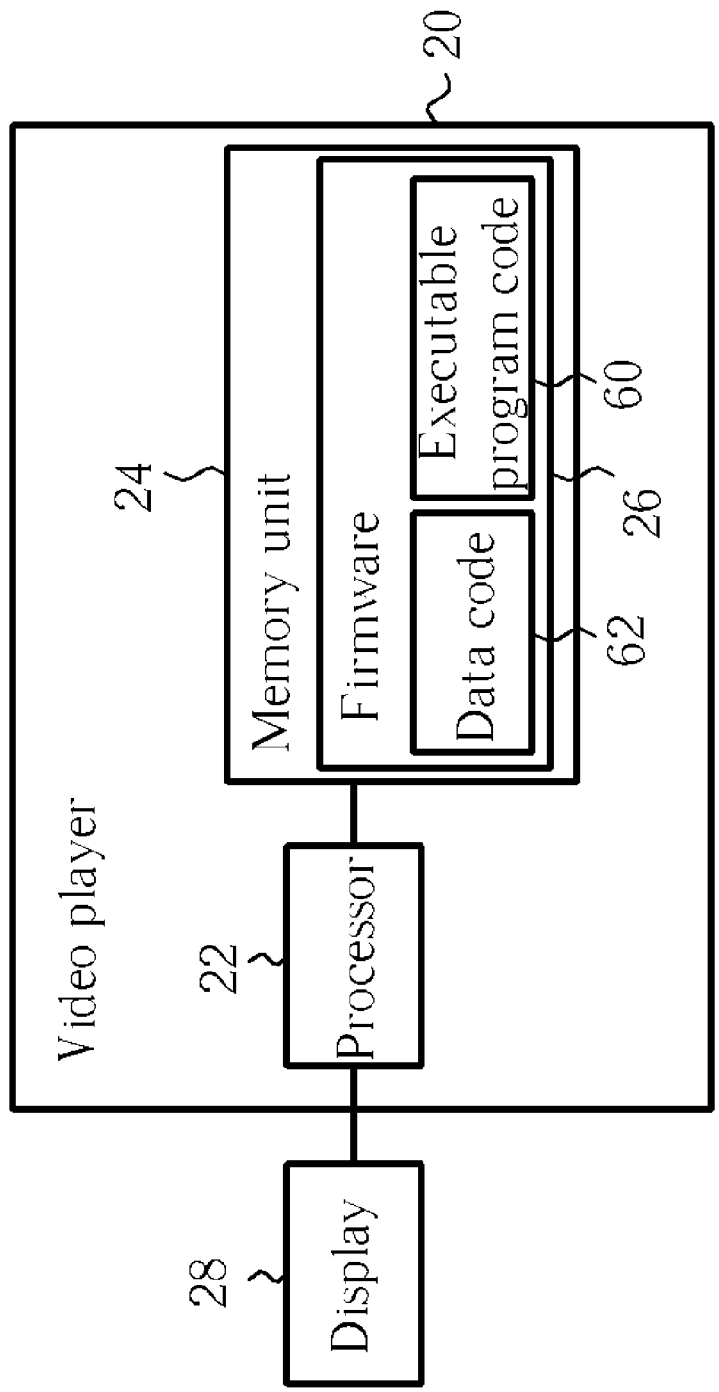
FIG. 3 is a functional block diagram of a video player according to an exemplary embodiment of the present invention.

Please refer to FIG. 3 showing a functional block diagram of a video player 20 according to an exemplary embodiment of the present invention. As shown in FIG. 3, the video player 20 is coupled to a display 28 and comprises a processor 22 and a memory unit 24. Please note that the processor 22, the memory unit 24, and the display 28 have the same functions as the components of the video player 10 having the same names. Therefore, the repeated descriptions of the functions of these components are omitted herein for the sake of brevity. In contrast to FIG. 1, the design of the source code of firmware 26 of FIG. 3 is different from the design of the source code of the firmware 16. According to this embodiment, the firmware 26 includes both an executable program code 60 and a data code 62. Therefore, while the processor 22 executes the executable program code 60, any necessary data is obtained by reading the data code 62.

In this way, the processor 22 controls the video player 20 by executing the firmware 26. For example, the video player 20 can control the display 28 to display a user interface by executing the firmware 26, and a user can input instructions via the user interface in order to control the video player 20. In this embodiment, the executable program code 60 includes a plurality of program execution modules for respectively controlling a setup menu system, an on screen display (OSD) system, a font display system, etc. The data code 62 includes reference data sets corresponding to the above-mentioned program execution modules such as a setup menu system data set, a system data set, a font data set, etc.

The manufacturer of the video player 20 provides its customers with the firmware 26, data editing software 30, and environment simulation software. The functions of the data editing software 30 and the environment simulation software are described in the following. Before the customer stores the firmware 26 into the memory unit 24 of the video player 20, the customer can utilize a personal computer or another kind of processors to execute the firmware 26 to generate a user interface to be displayed on a monitor (or another type of display) of the personal computer. If the customer is not satisfied with the user interface or wants, for example, to add/delete/modify natural languages or fonts supported by the video player 20 (i.e., the customer wants to add or delete a particular multinational language such as "Thai" or a font style "Times New Roman"), the customer can use a personal computer to execute the data editing software 30 and then directly modify the data code 62 using the data editing software 30. This means that the customer enjoys a level of freedom for adjusting the user interface of the video player 20. Additionally, the user can add/delete/modify multinational languages or font styles supported by the video player 20. Please note that the data editing software 30 is an executable file.

Figure 4:
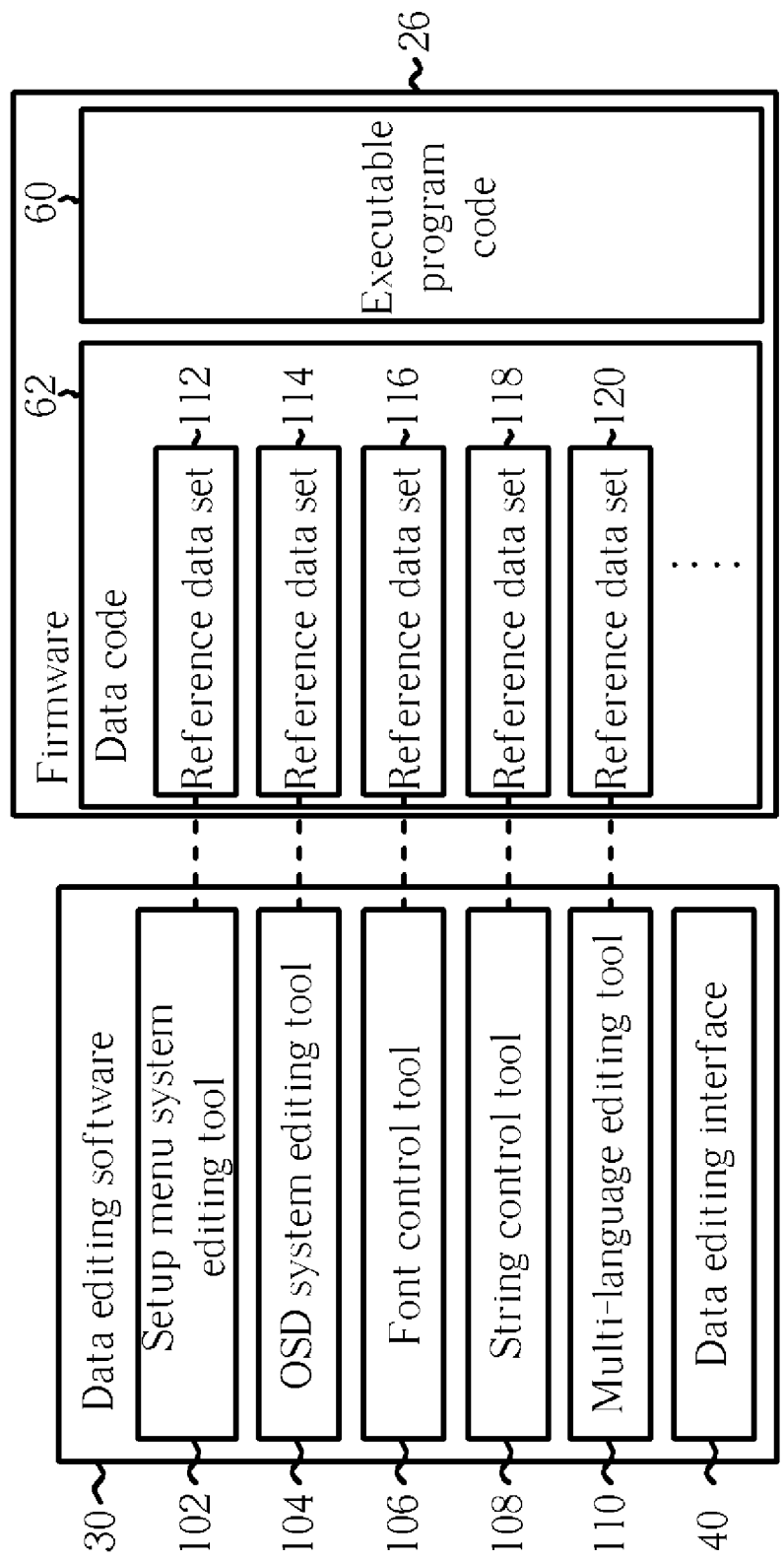
FIG. 4 is a diagram of the firmware shown in FIG. 3 and a data editing software according to an exemplary embodiment of the present invention.

A detailed description of modifying the firmware 26 according to this embodiment is illustrated in the following. Please additionally refer FIG. 4 showing a diagram of the data editing software 30 and the firmware 26 according to this embodiment of the present invention. The data editing software 30 includes a data editing interface 40, a setup menu system editing tool 102, an OSD system editing tool 104, a font control tool 106, a string control tool (e.g., a string table tool) 108, and a multi-language editing tool 110. The data editing interface 40 is visually displayed for the customer to edit the user interface of the video player 20 using tools 102, 104, 106, 108, and 110. The customer can input an attribute data set to the data editing software 30, and then a tool (e.g., one of the tools 102, 104, 106, 108 or 110) corresponding to the attribute data set is utilized for directly modifying a corresponding reference data set (e.g., the reference data sets 112, 114, 116, 118 or 120) according to the attribute data set. In this way, the data code 62 of the firmware 26 is directly modified according to the customer's requirement. It should also be noted that the data editing software 30 is not limited to the tools 102, 104, 106, 108, and 110 disclosed in the present embodiment. That is, in other embodiments, the data editing software 30 could also include different tools or different combinations of the above described tools. These other embodiments also belong to the scope of the present invention. The above-mentioned tools 102, 104, 106, 108, and 110 respectively modify the corresponding reference data sets 112, 114, 116, 118, and 120 (i.e., the above-mentioned setup menu system data set, the OSD system data set, the font data set, or other types of data sets) according to the corresponding attribute data sets, respectively. As shown in FIG. 4, the reference data sets 112, 114, 116, 118, and 120 are parts of the data code 62 and are utilized when the executable program code 60 of the firmware 26 is being executed. Please note that in the present embodiment, the tools 102, 104, 106, 108, and 110 respectively have a one to one mapping with the reference data sets 112, 114, 116, 118, and 120. However, in other embodiments, a reference data set could also correspond to a plurality of tools, or a tool could alternatively correspond to a plurality of reference data sets. Similarly, the tools 102, 104, 106, 108, and 110 respectively have a one to one mapping with the attribute data sets. However, in other embodiments, an attribute data set could also correspond to a plurality of tools, or a tool could alternatively correspond to a plurality of attribute data sets.

Figure 5:
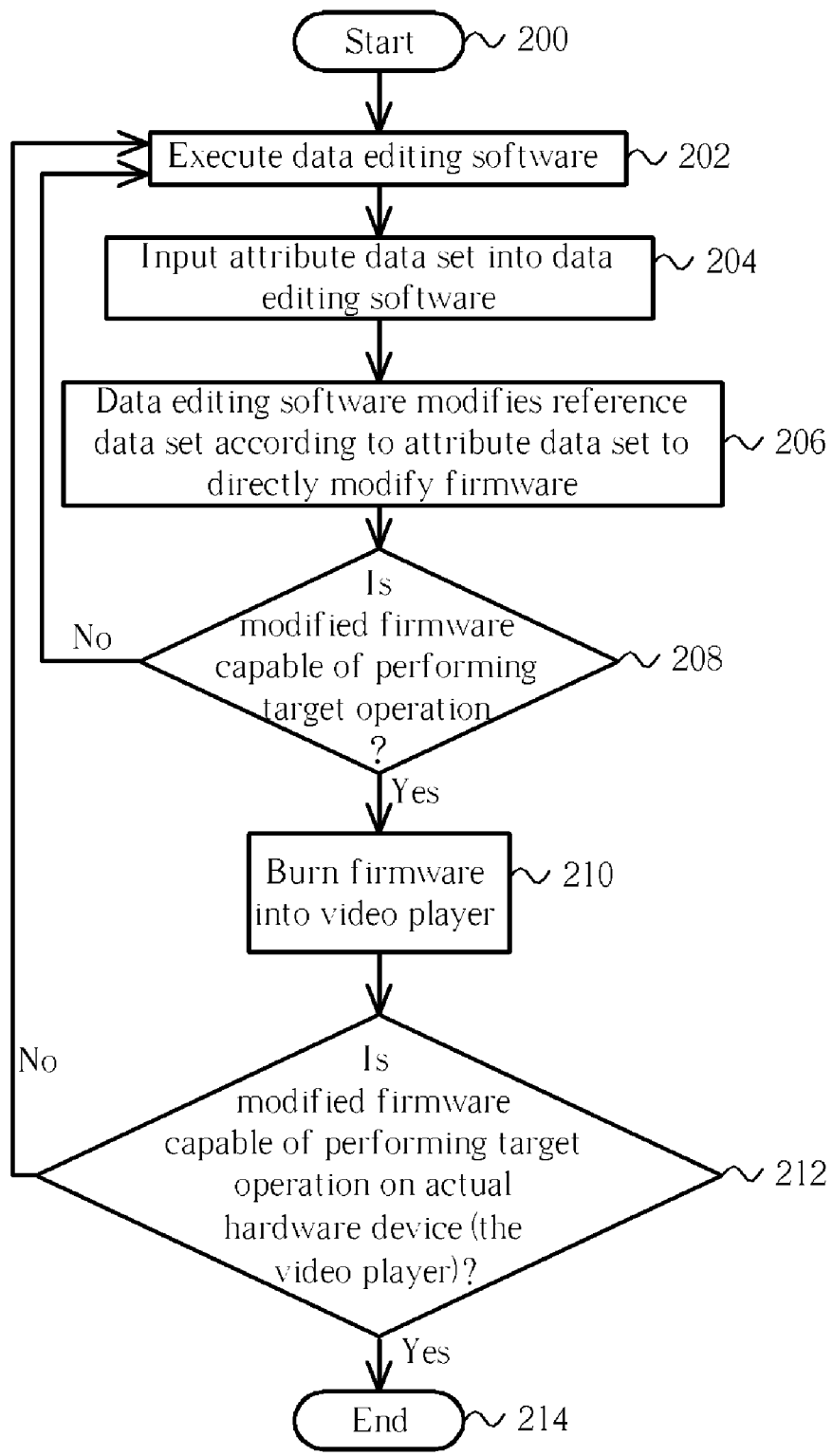
FIG. 5 is a flowchart describing a method for modifying firmware according to an exemplary embodiment of the present invention.

Please refer to FIG. 5 showing a flowchart describing a method for modifying firmware according to an exemplary embodiment of the present invention. Assume that the manufacturer receives a customer's request for modifying an original setting of the user interface of the video player 20. For example, the customer may need to modify the font style of text strings for visual buttons or the locations of the visual buttons displayed on the user interface. In this situation, the customer can utilize a personal computer to execute the data editing software 30 (steps 200 and 202), and can input an attribute data set 132 via the data editing interface 40 provided by the data editing software 30 (step 204). For example, the attribute data set 132 includes the required data provided by the customer, including the desired font style of the text strings for visual buttons and the desired locations of the visual buttons to be displayed on the user interface. Next, utilizing the setup menu system editing tool 102 of the data editing software 30, the attribute data set 132 can be transformed into the corresponding reference data set 112. That is, the data code 62 of the firmware 26 is directly modified (step 206) by the customer. Afterwards, if the customer wants to check the above-mentioned modification result for the new version of the user interface, the customer can utilize a personal computer to execute an environment simulation software to test the firmware 26. The environment simulation software is utilized for providing a simulation environment similar to the hardware device provided by the real video player 20. During simulation, the personal computer executes the executable program code 60 in the simulation environment provided by the environment simulation software and reads the modified data code 62 if necessary. In other words, the customer can immediately see the result of the modified user interface and check the text font style for the visual buttons or the locations of the visual buttons displayed on the modified user interface (step 208). If the customer is not satisfied with the modified user interface, the customer can input a new attribute data set into the data editing software 30 via the data editing interface 40 (steps 202 and 204) and then proceed with another simulation. If the customer is satisfied with the modified user interface, a memory programming device can be utilized to burn the modified firmware 26 into the memory unit 24 of the video player 20 (step 210). Afterwards, the customer may further check the firmware 26 for correct execution, but this time, utilizing the actual hardware device of the video player 20. In other words, a user interface is generated after the video player 20 executes the modified firmware 26, and then the customer can see the modified user interface displayed on the display 28 to check if the modified firmware 26 meets the specified requirements. If the customer is satisfied with the modified user interface displayed on the display 28, the process of modifying the firmware 26 can be ended (steps 212 and 214); otherwise, the customer can restart the data editing software 30 and input a new attribute data set into the data editing software 30 to modify the firmware 26 (steps 212 and 202).

Figure 6:
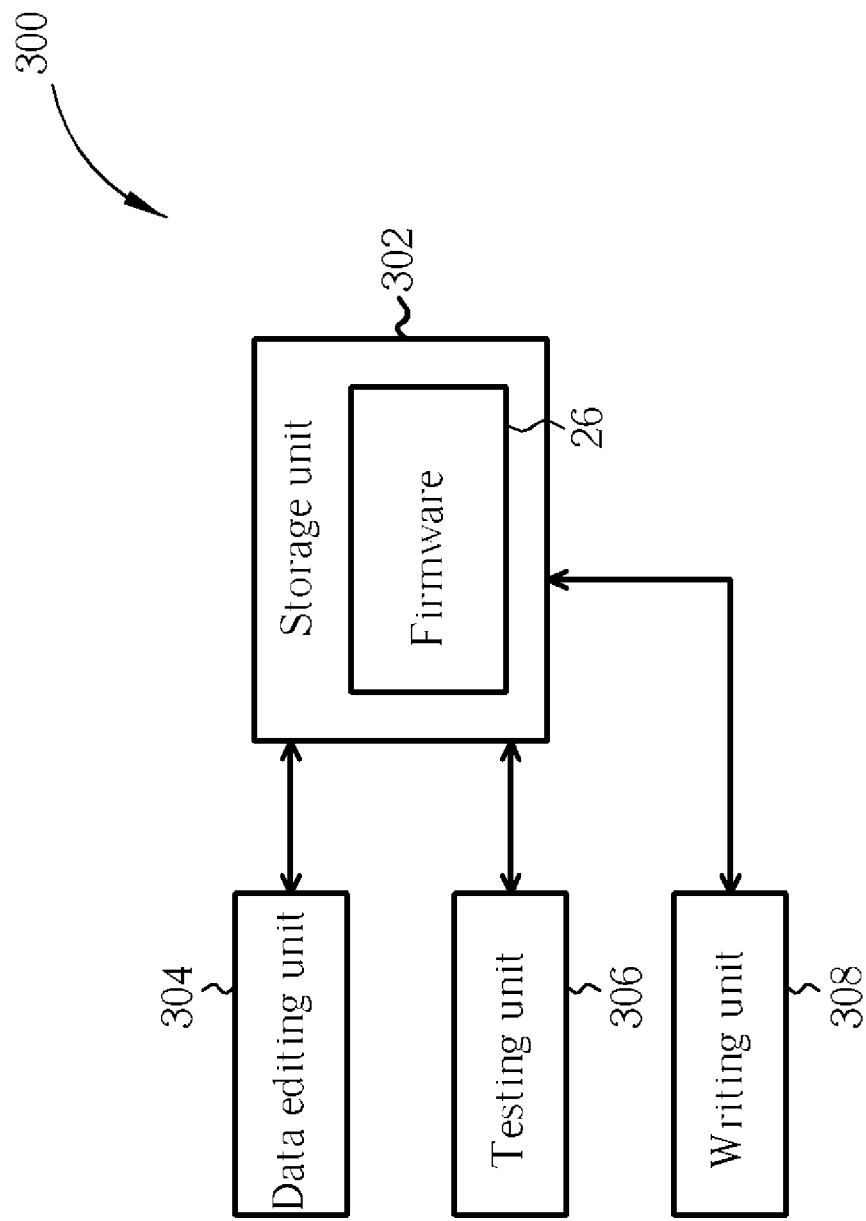
FIG. 6 is a functional block diagram of a firmware modification system according to the present invention.

Please refer to FIG. 6 showing a functional block diagram of a firmware modification system 300 according to an exemplary embodiment of the present invention. The customer utilizes a firmware modification system 300 (for example, a personal computer) to modify the firmware 26. As shown in FIG. 6, the firmware modification system 300 comprises a storage unit 302, a data editing unit 304, a testing unit 306, and a writing unit 308. The storage unit 302 stores the firmware 26, and the data editing unit 304 (for example, a processor of a personal computer executing the above-mentioned data editing software 30 to implement the data editing unit 304) modifies the firmware 26 (steps 202~206). In addition, the testing unit 306 (for example, a processor of a personal computer executing the above-mentioned environment simulation software to implement the testing unit 306) can execute the modified firmware on the firmware modification system 300 to facilitate a functional verification (step 208), and the writing unit 308 (for example, a processor of a personal computer executing writing software to implement the writing unit 308) then stores the modified firmware 26 stored in the storage unit 302 into the memory unit 24 of the video player 20 to update the firmware 26 stored in the memory unit 24. When the update of the firmware 26 stored in the memory unit 24 has completed, the video player 20 can begin the verification process of the firmware 26 performed on the hardware device (step 212).

Please note that in this embodiment, the attribute data set input by the customer can be formed using decimal type data, hexadecimal, or other types of data. The attribute data set is transformed into the reference data sets 112, 114, 116, 118, or 120 by the corresponding tools 102, 104, 106, 108, or 110, wherein the reference data sets 112, 114, 116, 118, and 120 are all binary data which can be directly read and executed by the executable program code 60.

In contrast to the related art, the present invention provides a system and a method for modifying firmware without requiring a compiling process. By utilizing the data editing software, a manufacturer of a video player does not need to be skillful in programming languages or to be capable of writing programs. That is, the customer can utilize the data editing software provided by the manufacturer of the video player to easily modify the firmware of the video player according to the customer's specific requirements. The customer does not need to request firmware coding engineers to modify the source code of the firmware and execute a compiling process to thereby compile the source code and generate the modified firmware of the video player for further testing. Hence, time is not required to be expended on the communication between the manufacturer and the customer, time is not required to be expended on compiling the source code to generate the modified firmware, and the workload of the manufacturer and the customer is reduced. Additionally, the data code of the firmware is the only part that can be modified in the firmware, and the actual executable program code of the firmware is not modified. Therefore, the executable program code is protected from improper modification, and unexpected errors caused by repeatedly modifying the source code of the firmware according to the related art will not occur.

Another advantage of the present invention is that the customer can utilize a personal computer to execute an environment simulation software tool to simulate the firmware and check if the execution result of the modified firmware meets the predetermined target requirements. The customer can thereby save a significant amount of time because it is not needed to wait for the modified firmware to be burned into the memory unit of the video player for testing of the modified firmware on the hardware device. The present invention can be applied to an optical storage medium player or an optical storage medium recorder, such as a DVD player and a VCD player, or other electronic products, to reduce the costs and time expended on product development.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for modifying firmware of an optical storage medium device, the firmware including an executable program code and at least one reference data set, the method comprising a processor executed steps of:
   utilizing a data editing unit of a firmware modification system to input an attribute data set for setting a user interface;
   modifying the firmware by modifying the reference data set to generate a modified firmware according to the attribute data set received by the data editing unit, wherein the executable program code is not modified when the firmware is being modified;
   determining if the modified firmware performs a target operation before the modified firmware is written into the optical storage medium device; and
   writing the modified firmware into the optical storage medium device after the modified firmware performs the target operation.

2. The method of claim 1, further comprising displaying the user interface according to the attribute data set.

3. The method of claim 1, wherein the above-mentioned step of modifying the reference data set is repeated until the user interface satisfies a target operation.

4. The method of claim 1, wherein the firmware comprises a plurality of reference data sets, and the data editing software comprises a plurality of editing tools for respectively modifying the reference data sets.

5. The method of claim 4, wherein the editing tools comprise an on screen display (OSD) system editing tool and a setup menu system editing tool.

6. The method of claim 5, wherein the editing tools further comprise a font control tool, a string control tool, and a multi-language editing tool.

7. The method of claim 1, wherein the optical storage medium device is an optical storage medium player or an optical storage medium recorder.

8. A method for modifying firmware of an optical storage medium device, the firmware including an executable program code and at least one reference data set, the method comprising a processor executed steps of:
   inputting an attribute data set for setting a user interface;
   modifying the firmware by modifying the reference data set to generate a modified firmware according to the attribute data set, wherein the executable program code is not modified when the firmware is being modified;
   determining if the modified firmware performs a target operation before the modified firmware is written into the optical storage medium device, wherein the user interface is displayed according to the attribute data set;
   displaying the user interface according to the attribute data set; and
   writing the modified firmware into the optical storage medium device after the modified firmware performs the target operation.

9. The method of claim 8, wherein the above-mentioned step of modifying the reference data set is repeated until the user interface satisfies a target operation.

10. The method of claim 8, wherein the firmware comprises plurality of reference data sets, and the data editing software comprises a plurality of editing tools for respectively modifying the reference data sets.

11. The method of claim 8, wherein the editing tools comprise an on screen display (OSD) system editing tool and a setup menu system editing tool.

12. The method of claim 11, wherein the editing tools further comprise a font control tool, a string control tool, and a multi-language editing tool.

13. The method of claim 8, wherein the optical storage medium device is an optical storage medium player or an optical storage medium recorder.

14. A system for modifying firmware of an optical storage medium device, comprising:
 a processor;
 a storage unit for storing a firmware, the firmware including an executable program code and at least one reference data set, wherein the executable program code reads the reference data set to control operations of the optical storage medium device;
 a data editing unit for inputting an attribute data set for setting a user interface, and modifying the firmware by modifying the reference data set to generate a modified firmware according to the attribute data set, wherein the executable program code is not modified when the firmware is being modified;
 a testing unit for determining if the modified firmware performs a target operation before the modified firmware is written into the optical storage medium device; and
 a writing unit for writing the modified firmware into the optical storage medium device after the modified firmware performs the target operation.

15. The system of claim 14,
 wherein the user interface is displayed according to the attribute data set.

16. The system of claim 14, wherein the firmware includes a plurality of reference data sets, and the data editing software includes a plurality of editing tools for respectively modifying the reference data sets.

17. The system of claim 16, wherein the editing tools comprise an on screen display (OSD) system editing tool and a setup menu system editing tool.

18. The system of claim 17, wherein the editing tools further comprise a font control tool, a string control tool, and a multi-language editing tool.

19. The system of claim 14, wherein the optical storage medium device is an optical storage medium player or an optical storage medium recorder.

20. A system for modifying firmware of an optical storage medium device, comprising:
 a processor
 a storage unit for storing a firmware, the firmware including an executable program code and at least one reference data set, wherein the executable program code reads the reference data set to control operations of the optical storage medium device;
 a data editing unit for inputting an attribute data set for setting a user interface, and modifying the firmware by modifying the reference data set to generate a modified firmware according to the attribute data set, wherein the executable program code is not modified when the firmware is being modified;
 a testing unit for determining if the modified firmware performs a target operation before the modified firmware is written into the optical storage medium device, wherein the user interface is displayed according to the attribute data set; and
 a writing unit for writing the modified firmware into the optical storage medium device after the modified firmware performs the target operation.

21. The system of claim 20, wherein the firmware includes a plurality of reference data sets, and the data editing software includes a plurality of editing tools for respectively modifying the reference data sets.

22. The system of claim 21, wherein the editing tools comprise an on screen display (OSD) system editing tool and a setup menu system editing tool.

23. The system of claim 22, wherein the editing tools further comprise a font control tool, a string control tool, and a multi-language editing tool.

24. The system of claim 20, wherein the optical storage medium device is an optical storage medium player or an optical storage medium recorder.

* * * * *